US012272250B2

(12) United States Patent
Howell

(10) Patent No.: US 12,272,250 B2
(45) Date of Patent: Apr. 8, 2025

(54) METHOD OF LANDING AN AIRCRAFT

(71) Applicant: Airbus Operations Limited, Bristol (GB)

(72) Inventor: George Howell, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 287 days.

(21) Appl. No.: 17/795,403

(22) PCT Filed: Jan. 19, 2021

(86) PCT No.: PCT/EP2021/051012
§ 371 (c)(1),
(2) Date: Jul. 26, 2022

(87) PCT Pub. No.: WO2021/151718
PCT Pub. Date: Aug. 5, 2021

(65) Prior Publication Data
US 2023/0077168 A1 Mar. 9, 2023

(30) Foreign Application Priority Data
Jan. 27, 2020 (GB) ...................................... 2001122

(51) Int. Cl.
*G08G 5/00* (2006.01)
*G08G 5/02* (2006.01)

(52) U.S. Cl.
CPC ......... *G08G 5/0008* (2013.01); *G08G 5/0021* (2013.01); *G08G 5/0039* (2013.01); *G08G 5/02* (2013.01)

(58) Field of Classification Search
CPC .. G08G 5/0008; G08G 5/0021; G08G 5/0039; G08G 5/02
See application file for complete search history.

(56) References Cited

U.S. PATENT DOCUMENTS 6,718,236 B1 4/2004 Hammer et al.
10,037,704 B1 7/2018 Myr
(Continued)

FOREIGN PATENT DOCUMENTS

EP 2 800 082 11/2014
EP 3 550 541 10/2019

OTHER PUBLICATIONS

International Search Report and Written Opinion of the ISA for PCT/EP2021/051012, dated Apr. 30, 2021 (12 pages).
(Continued)

*Primary Examiner* — James J Lee
*Assistant Examiner* — Steven Vu Nguyen
(74) *Attorney, Agent, or Firm* — Nixon & Vanderhye P.C.

(57) ABSTRACT

A method of landing an aircraft in which the aircraft receives information from a second aircraft via a direct aircraft-to-aircraft communication from the second aircraft to the aircraft; determines a landing plan of the aircraft based on the information; and lands the aircraft based on the landing plan. The use of a direct aircraft-to-aircraft communication (i.e. a communication from the second aircraft to the first aircraft which does not travel via an intermediary such as a land station, air traffic controller or satellite) makes the method reliable because such a communication is inherently secure and difficult to hack.

14 Claims, 9 Drawing Sheets

(56) References Cited

U.S. PATENT DOCUMENTS

| | | | |
|---|---|---|---|
| 2008/0234882 A1 | 9/2008 | Villaume et al. | |
| 2017/0132943 A1 | 5/2017 | Moon et al. | |
| 2017/0243497 A1 | 8/2017 | Kuttappan et al. | |
| 2017/0337828 A1* | 11/2017 | Kathirvel | G08G 5/0008 |
| 2018/0218615 A1* | 8/2018 | Myr | B64F 1/002 |
| 2019/0172361 A1 | 6/2019 | Schwindt | |
| 2019/0251852 A1 | 8/2019 | Moll | |
| 2020/0027360 A1* | 1/2020 | Casey | G05D 1/0088 |

OTHER PUBLICATIONS

Combined Search and Examination Report for GB 2001122.7, dated Jul. 9, 2020, (7 pages).

* cited by examiner

METHOD OF LANDING AN AIRCRAFT

RELATED APPLICATION

This application is the U.S. national phase of International Application PCT/EP2021/051012, filed Jan. 19, 2021, which designated the U.S. and claims priority to United Kingdom Patent Application GB 2001122.7, filed Jan. 27, 2020, the entire contents of each of which are hereby incorporated by reference.

FIELD OF THE INVENTION

The present invention relates to a method of landing an aircraft, and an aircraft comprising a landing system configured to land the aircraft.

BACKGROUND OF THE INVENTION

To aid pilots in landing scenarios a brake-to-vacate system can determine a landing plan for the aircraft which will optimise a landing to vacate from the runway at an appropriate exit.

When approaching to land, there are a variety of factors that may drive how the aircraft decelerates and which runway exits it takes (i.e. the landing plan). These include: time to reach the gate, time to allow brakes to cool for the next flight, amount of brake wear, amount of tyre wear, fuel burn during landing, and taxiing to reach the gate.

SUMMARY OF THE INVENTION

A first aspect of the invention provides a method of landing an aircraft, the aircraft comprising a first aircraft, the first aircraft comprising a landing system, the method comprising operating the landing system to: receive information from a second aircraft via a direct aircraft-to-aircraft communication from the second aircraft to the first aircraft; determine a landing plan of the first aircraft based on the information; and land the first aircraft based on the landing plan of the first aircraft.

The use of a direct aircraft-to-aircraft communication (i.e. a communication from the second aircraft to the first aircraft which does not travel via an intermediary such as a land station, air traffic controller or satellite) makes the method reliable because such a communication is inherently secure and difficult to hack.

The landing plan of the first aircraft may comprise at least one of: an approach air speed, a runway speed profile, a braking command profile, a thrust reverser command profile, a spoiler deployment profile, an exit from the runway, and a taxiing route.

The landing plan of the first aircraft may be determined by revising an initial landing plan of the first aircraft.

The landing plan of the first aircraft may be determined by an optimisation algorithm, such as an evolutionary algorithm.

The first and second aircraft may be members of a virtual fleet of aircraft, and the optimisation algorithm may determine an optimised set of landing plans for the virtual fleet of aircraft which is optimised for the entire virtual fleet. The virtual fleet may have only two members (i.e. the first and second aircraft) but more typically the virtual fleet has three, four or more members.

The information received from the second aircraft may comprise information associated with the second aircraft, such as a static aircraft parameter of the second aircraft (for example weight); status information of the second aircraft (for example brake wear, tyre wear, fuel amount); schedule information of the second aircraft (for example acceptable delay or scheduled arrival time); and/or a landing plan of the second aircraft (for example an approach air speed, a runway speed profile, a braking command profile, a thrust reverser command profile, a spoiler deployment profile, an exit from the runway, a taxiing route etc.).

The landing system may be operated to receive further information associated with a third aircraft; and determine the landing plan of the first aircraft based on the information associated with the second aircraft and the information associated with the third aircraft.

The further information may be received via a direct aircraft-to-aircraft communication to the first aircraft from the second aircraft (for example as part of a "daisy-chain" network) or from the third aircraft (for example as part of a "hub and spoke" network).

The landing plan of the first aircraft may be transmitted to the second aircraft.

The landing plan of the first aircraft may be transmitted to the second aircraft via a direct aircraft-to-aircraft communication from the first aircraft to the second aircraft. A landing system of the second aircraft may determine a landing plan of the second aircraft based on the landing plan of the first aircraft.

A second aspect of the invention provides an aircraft comprising a landing system configured to land the aircraft by the method of the first aspect, wherein the aircraft is a first aircraft, the aircraft landing system comprising: a receiver arranged to receive information from a second aircraft via a direct aircraft-to-aircraft communication from the second aircraft to the first aircraft; a processor arranged to determine a landing plan of the first aircraft based on the information; and one or more actuators arranged to land the first aircraft based on the landing plan of the first aircraft.

A further aspect of the invention provides a pair of aircraft comprising: a first aircraft according to the second aspect; and a second aircraft arranged to transmit the information to the first aircraft via the direct aircraft-to-aircraft communication from the second aircraft to the first aircraft.

A further aspect of the invention provides a method of landing an aircraft, the aircraft comprising a first aircraft, wherein the first aircraft is a member of a virtual fleet of aircraft and the first aircraft comprises a landing system, the method comprising operating the landing system to: receive landing plans of all other aircraft of the virtual fleet; input the landing plans of all other aircraft of the virtual fleet into an optimisation algorithm which determines a set of landing plans for the virtual fleet of aircraft which is optimised for the entire virtual fleet, the optimised set of landing plans for the virtual fleet of aircraft including a landing plan of the first aircraft; and land the first aircraft based on the landing plan of the first aircraft.

The virtual fleet may have only two members, but more typically the virtual fleet has three, four or more members.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
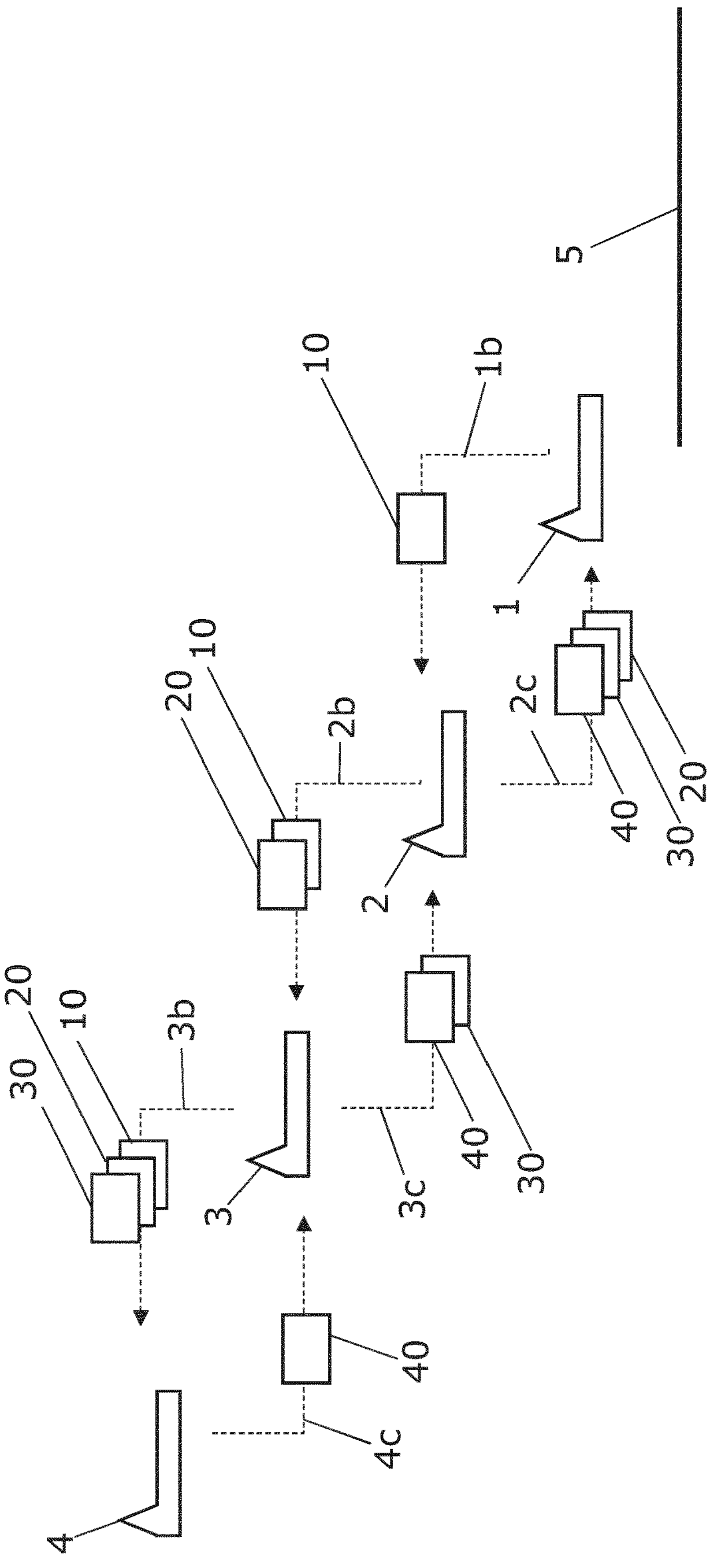
FIG. 1 shows a virtual aircraft fleet communicating via a two-way daisy-chain network.

FIG. 1 shows a virtual fleet of four aircraft 1-4 in descent, approaching an airport 5. The virtual fleet comprises a first aircraft 1 (which at this stage is a lead aircraft) and three following aircraft 2-4. The following aircraft comprise a second aircraft 2, a third aircraft 3 and a fourth aircraft 4. The airport 5 may have a single runway or a collection of runways with shared taxiing or parking areas.

Each aircraft 1-4 has an initial landing plan. This plan may include an approach air speed, a runway speed profile, a braking command profile, a thrust reverser command profile, a spoiler deployment profile, an exit from the runway, and/or a taxiing route etc.

An initial landing plan of the first aircraft 1 is given below in Table 1.

TABLE 1

| Aircraft Speed | Braking Command | Thurst Reverser Command | Spoiler Deployed | Runway Distance |
|---|---|---|---|---|
| 140 | 0 | 0 | 0 | 0 |
| 135 | 0 | 0 | 0 | 0 |
| 130 | 0 | 0 | 0 | 0 |
| 125 | 0 | 0 | 0 | 0 |
| 120 | 0 | 0 | 0 | 0 |
| 112.75 | 5 | 1 | 1 | 338 |
| 105.5 | 5 | 1 | 1 | 655 |
| 98.25 | 5 | 1 | 1 | 950 |
| 91 | 5 | 1 | 1 | 1223 |
| 83.75 | 5 | 1 | 1 | 1474 |
| 76.5 | 5 | 1 | 1 | 1703 |
| 69.25 | 5 | 1 | 1 | 1911 |
| 62 | 5 | 1 | 1 | 2097 |
| 54.75 | 5 | 1 | 1 | 2261 |
| 47.5 | 5 | 1 | 1 | 2404 |
| 40.25 | 5 | 1 | 1 | 2525 |
| 33 | 5 | 1 | 1 | 2624 |
| 25.75 | 5 | 1 | 1 | 2701 |
| 18.5 | 5 | 1 | 1 | 2756 |
| 11 | 10 | 1 | 1 | 2789 |
| 3.25 | 15 | 1 | 1 | 2799 |
| 0 | 20 | 0 | 0 | 2799 |

Figure 2:
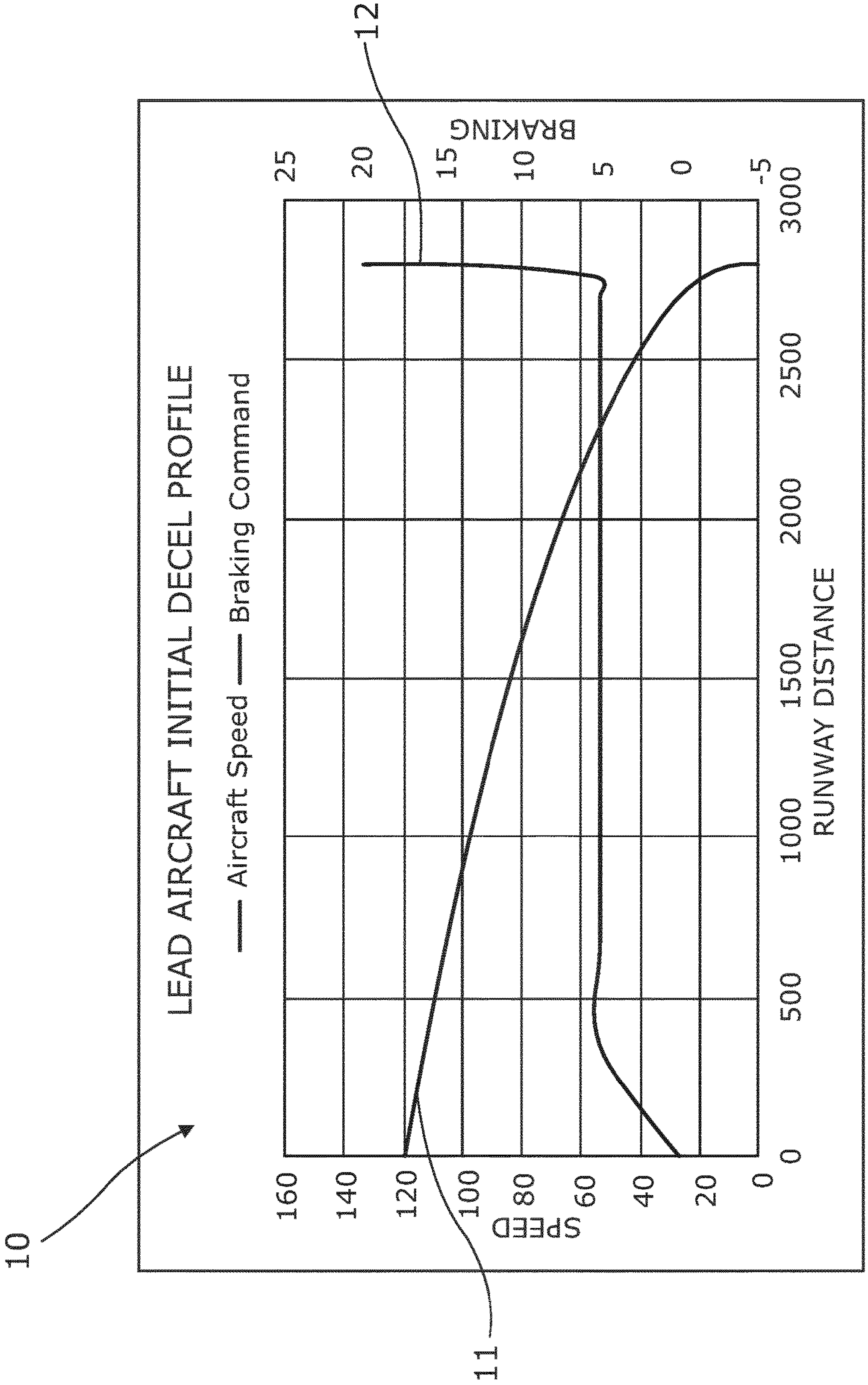
FIG. 2 shows an initial landing plan of a first aircraft.

The initial landing plan of the first aircraft 1 is graphically illustrated in FIG. 2. The landing plan 10 of FIG. 2 includes a runway speed profile 11 which reduces to zero at a runway distance of 2799 ft, and a braking command profile 12 which involves only light braking until a runway distance of 2789 ft is reached. The first aircraft 1 is a heavy aircraft, so the initial landing plan 10 provides low braking and a long runway exit to minimise brake and tyre wear.

As shown in FIG. 1, the first aircraft 1 transmits its landing plan 10 to the second aircraft 2 via a direct aircraft-to-aircraft communication 1*b* from the first aircraft 1 to the second aircraft 2.

An initial landing plan of the second aircraft 2 is given below in Table 2.

TABLE 2

| Aircraft Speed | Braking Command | Thurst Reverser Command | Spoiler Deployed | Runway Distance |
|---|---|---|---|---|
| 140 | 0 | 0 | 0 | 0 |
| 135 | 0 | 0 | 0 | 0 |
| 130 | 0 | 0 | 0 | 0 |
| 125 | 0 | 0 | 0 | 0 |
| 120 | 0 | 0 | 0 | 0 |
| 115 | 0 | 0 | 0 | 0 |
| 110 | 0 | 0 | 0 | 0 |
| 105 | 0 | 0 | 0 | 0 |
| 100 | 0 | 0 | 0 | 0 |
| 87 | 122 | 1 | 1 | 261 |
| 74 | 122 | 1 | 1 | 482 |
| 61 | 122 | 1 | 1 | 664 |
| 48 | 122 | 1 | 1 | 807 |
| 35 | 122 | 1 | 1 | 911 |
| 21 | 122 | 1 | 1 | 975 |
| 8 | 122 | 1 | 1 | 1000 |
| 0 | 122 | 1 | 1 | 1000 |
| 0 | 122 | 1 | 1 | 1000 |
| 0 | 122 | 1 | 1 | 1000 |
| 0 | 122 | 1 | 1 | 1000 |
| 0 | 122 | 1 | 1 | 1000 |
| 0 | 122 | 0 | 0 | 1000 |

Figure 3:
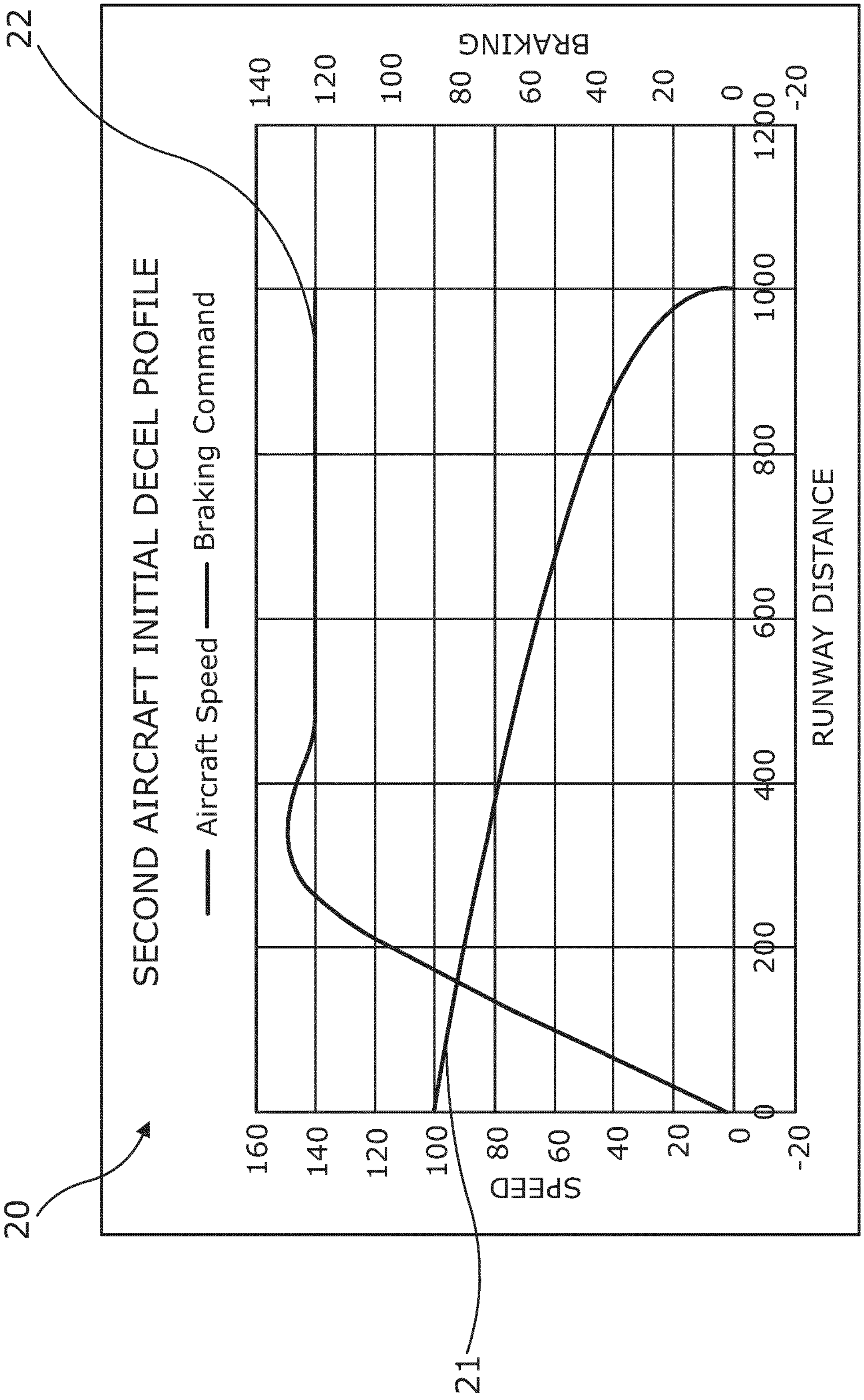
FIG. 3 shows an initial landing plan of a second aircraft.

The initial landing plan of the second aircraft 2 is graphically illustrated in FIG. 3. The landing plan 20 of FIG. 3 includes a runway speed profile 21 which reduces to zero at a runway distance of 1000 ft, and a braking command profile 22 which involves early and heavy braking starting at a runway distance of 261 ft. The second aircraft 2 may be a lighter aircraft than the first aircraft 1 and/or it may be running late. Both of these factors may influence the landing plan 20, which minimises the time taken to arrive at the runway exit.

As shown in FIG. 1, the second aircraft 2 transmits its landing plan 20 to the third aircraft 3 via a direct aircraft-to-aircraft communication 2*b* from the second aircraft 2 to the third aircraft 3. The second aircraft 2 also forwards the landing plan 10 of the first aircraft 1 to the third aircraft 3, either as part of the communication 2*b* (as indicated in FIG. 1) or in another direct aircraft-to-aircraft communication on the same channel from the second aircraft 2 to the third aircraft 3.

This process continues in a "daisy-chain" from the first aircraft 1 to the fourth aircraft 4. Thus the third aircraft 3 forwards the landing plans 10, 20 to the fourth aircraft 4, and also sends the fourth aircraft 4 its own landing plan 30. The daisy-chain may continue further to include many more aircraft.

A similar daisy-chain communication network operates in the opposite direction. Thus the fourth aircraft 4 sends the third aircraft 3 its landing plan 40 (optionally along with landing plans from any other aircraft behind the fourth aircraft 4) via a direct aircraft-to-aircraft communication 4*c*; the third aircraft 3 sends the second aircraft 2 the landing plans 30, 40 via a direct aircraft-to-aircraft communication 3*c*; and the second aircraft 2 sends the first aircraft 1 the landing plans 20, 30, 40 via a direct aircraft-to-aircraft communication 2*c*.

The two-way daisy-chain communication network of FIG. 1 results in each and every aircraft 1-4 receiving the landing plans of all of the other aircraft in the virtual fleet.

The set of landing plans can then be analysed collectively at each aircraft by an optimisation algorithm run on-board the aircraft by a landing system of the aircraft, and changed if necessary to provide an optimised set of landing plans for the aircraft 1-4 which are optimal in a collective sense. In other words the collective landing plan (i.e. the set of landing plans) of the virtual fleet is optimised, rather than landing plans being optimised on an individual basis.

The direct aircraft-to-aircraft communications 1*b*, 2*b*, 3*b*, 2*c*, 3*c*, 4*c* avoid transmitting information to a land station, air traffic controller, satellite or other intermediary which is not a member of the virtual fleet. Such direct aircraft-to-aircraft communications are inherently secure and difficult to hack. This increases the certainty that the overall optimisation of the virtual fleet is close-to-optimal, and that the determined set of landing plans is indeed close-to-optimal. Each communication may be further secured by an encryption algorithm, or other layers of communication security.

Figure 4:
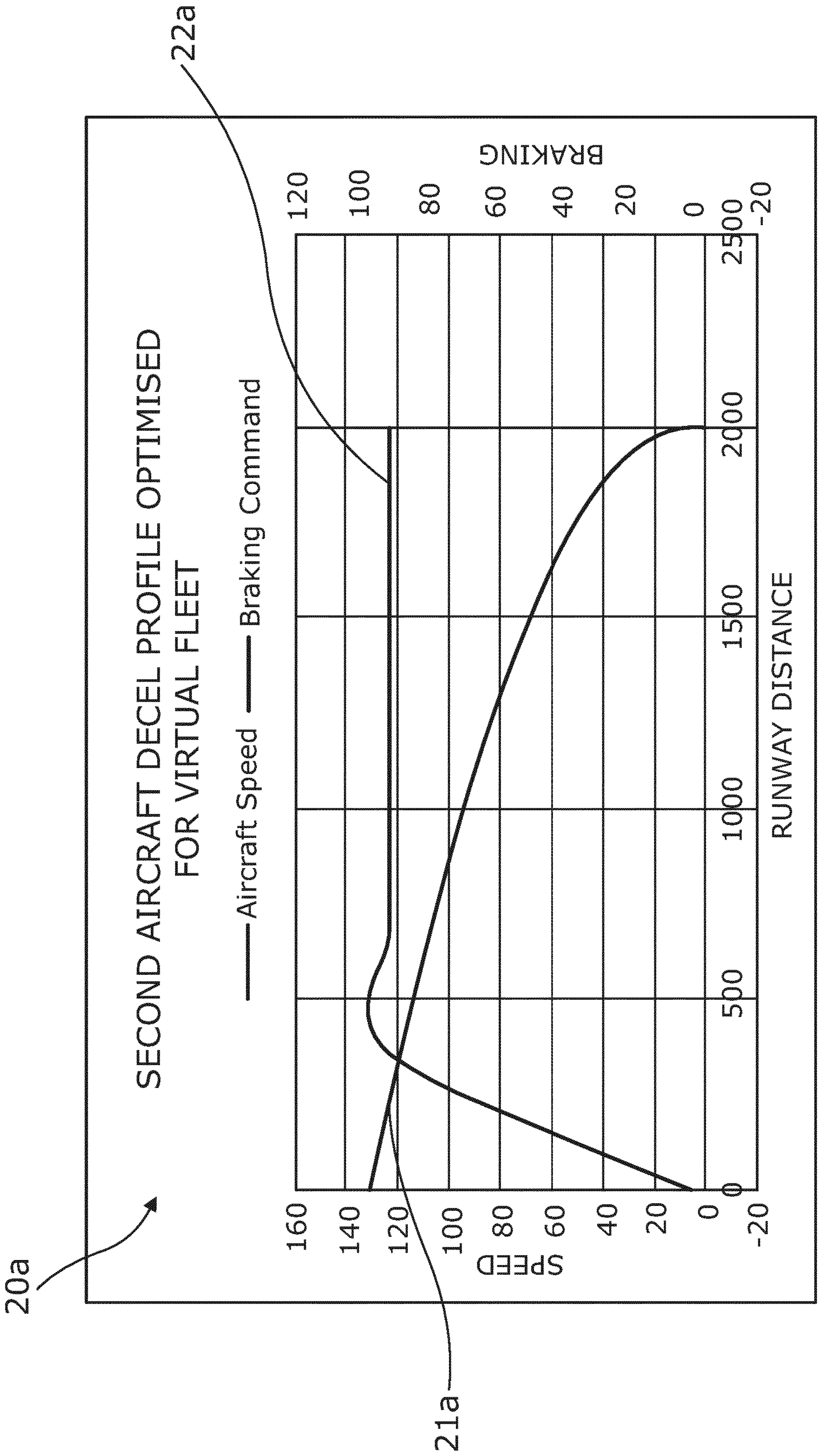
FIG. 4 shows a revised landing plan of the first aircraft.

Table 3 and FIG. 4, show a revised landing plan 20*a* of the second aircraft 2 which has been revised by the optimisation algorithm.

TABLE 3

| Aircraft Speed | Braking Command | Thurst Reverser Command | Spoiler Deployed | Runway Distance |
|---|---|---|---|---|
| 140 | 0 | 0 | 0 | 0 |
| 135 | 0 | 0 | 0 | 0 |
| 130 | 0 | 0 | 0 | 0 |
| 118 | 91 | 1 | 1 | 355 |
| 107 | 91 | 1 | 1 | 676 |
| 95 | 91 | 1 | 1 | 962 |
| 84 | 91 | 1 | 1 | 1213 |
| 72 | 91 | 1 | 1 | 1430 |
| 61 | 91 | 1 | 1 | 1611 |
| 49 | 91 | 1 | 1 | 1758 |
| 37 | 91 | 1 | 1 | 1871 |
| 26 | 91 | 1 | 1 | 1949 |
| 14 | 91 | 1 | 1 | 1992 |
| 3 | 91 | 1 | 1 | 2000 |
| 0 | 91 | 1 | 1 | 2000 |
| 0 | 91 | 1 | 1 | 2000 |
| 0 | 91 | 1 | 1 | 2000 |
| 0 | 91 | 1 | 1 | 2000 |
| 0 | 91 | 1 | 1 | 2000 |
| 0 | 91 | 1 | 1 | 2000 |
| 0 | 91 | 1 | 1 | 2000 |
| 0 | 91 | 0 | 0 | 2000 |

The revised landing plan 20*a* includes a revised runway speed profile 21*a* which reduces to zero at a runway distance of 2000 ft (rather than 1000 ft as in the initial runway speed profile 20) and a revised braking command profile 22*a* which involves lighter braking than the initial braking command profile 22. The revised landing plan 20*a* may result from the fact that the third aircraft 3 and/or the fourth aircraft 4 have a more pressing need to use gates associated with the early runway exit that the second aircraft 2 was planning to use as part of its initial landing plan 20. So in the revised landing plan 20*a*, the second aircraft 2 relaxes its braking plan to go to the next runway exit.

Figure 5:
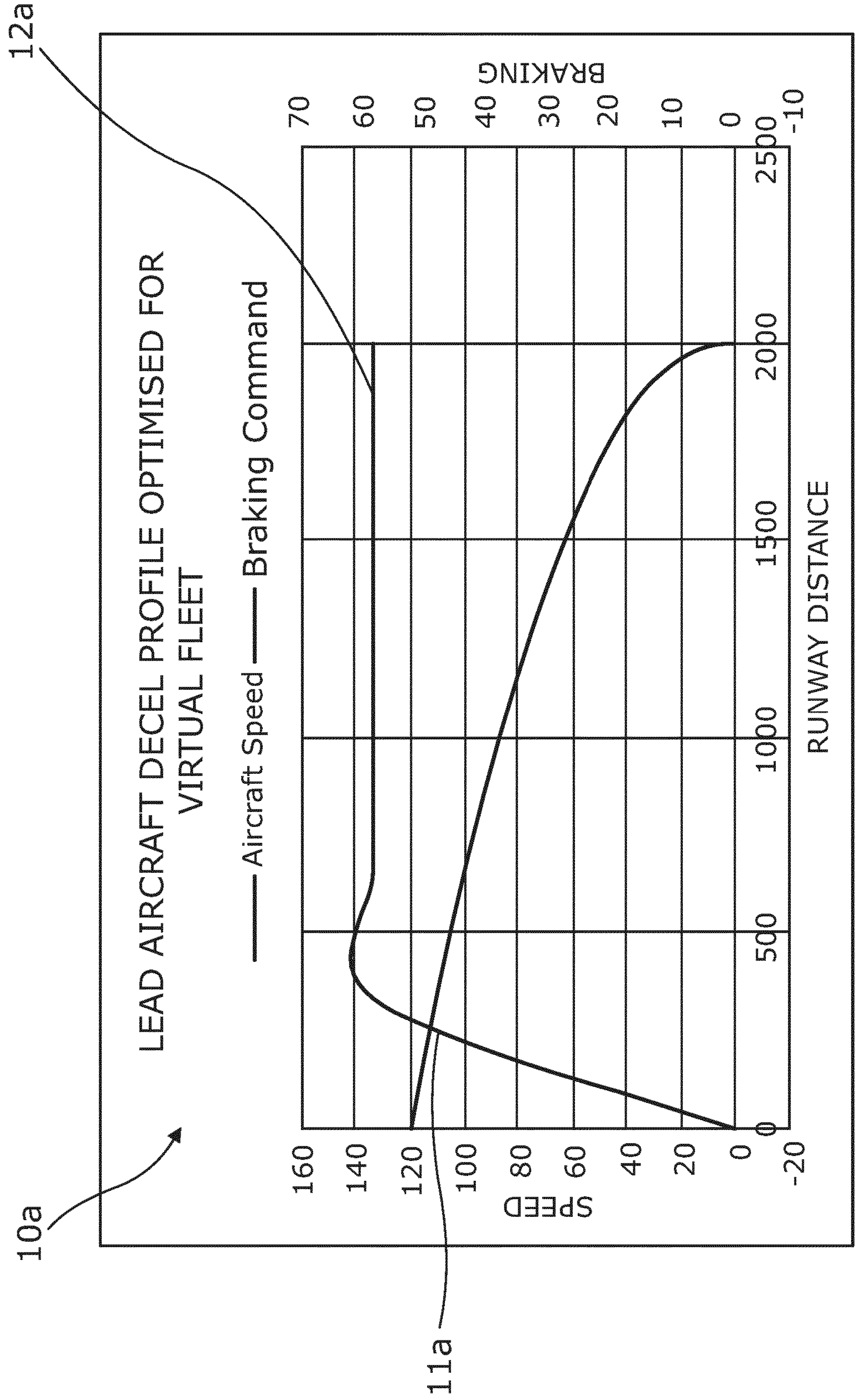
FIG. 5 shows a revised landing plan of the second aircraft.

Table 4 and FIG. 5 show a revised landing plan 10*a* of the first aircraft 1 which has been revised by the optimisation algorithm.

TABLE 4

| Aircraft Speed | Braking Command | Thurst Reverser Command | Spoiler Deployed | Runway Distance |
|---|---|---|---|---|
| 140 | 0 | 0 | 0 | 0 |
| 135 | 0 | 0 | 0 | 0 |
| 130 | 0 | 0 | 0 | 0 |

TABLE 4-continued

| Aircraft Speed | Braking Command | Thurst Reverser Command | Spoiler Deployed | Runway Distance |
|---|---|---|---|---|
| 125 | 0 | 0 | 0 | 0 |
| 120 | 0 | 0 | 0 | 0 |
| 110 | 58 | 1 | 1 | 330 |
| 100 | 58 | 1 | 1 | 631 |
| 90 | 58 | 1 | 1 | 902 |
| 80 | 58 | 1 | 1 | 1143 |
| 70 | 58 | 1 | 1 | 1354 |
| 61 | 58 | 1 | 1 | 1535 |
| 51 | 58 | 1 | 1 | 1687 |
| 41 | 58 | 1 | 1 | 1809 |
| 31 | 58 | 1 | 1 | 1902 |
| 21 | 58 | 1 | 1 | 1964 |
| 11 | 58 | 1 | 1 | 1997 |
| 1 | 58 | 1 | 1 | 2000 |
| 0 | 58 | 1 | 1 | 2000 |

The revised landing plan 10*a* includes a runway speed profile 11*a* which reduces to zero at a runway distance of 2000 ft (rather than 2750 ft as in the initial runway speed profile 11), and a braking command profile 12*a* which is heavier than the initial braking command profile 12. The revised landing plan 10*a* may result from the fact that the following aircraft 2-4 have a pressing need to minimise delays, so in the revised landing plan 10*a* the first aircraft 1 increases its braking to exit the runway earlier.

In the case of FIGS. 4 and 5 the landing plans of the first two aircraft 1, 2 change so that multiple following aircraft running late can exit the runway and get to their gates faster, even though this results in increased brake wear for the first aircraft 1 and longer gate-to-gate flight time for the second aircraft 2.

Figure 6:
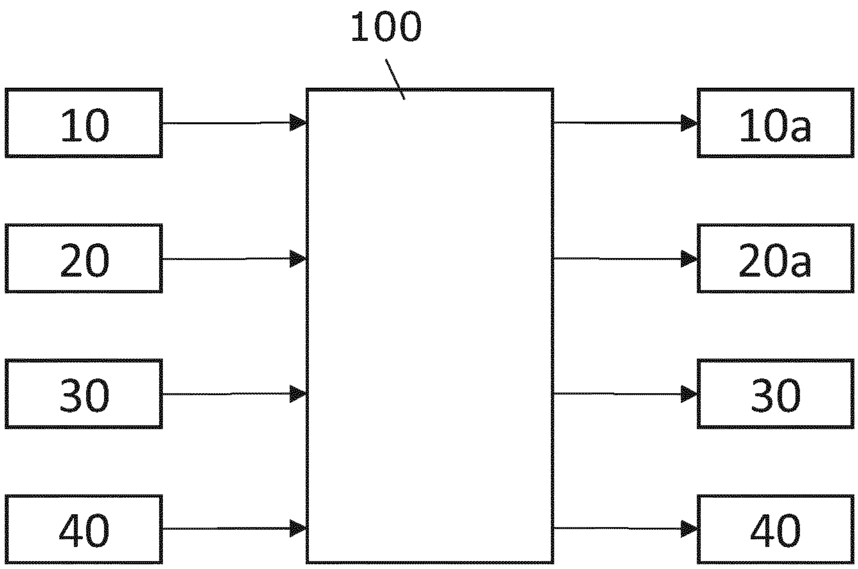
FIG. 6 shows inputs and outputs of an optimisation algorithm.
Figure 7:
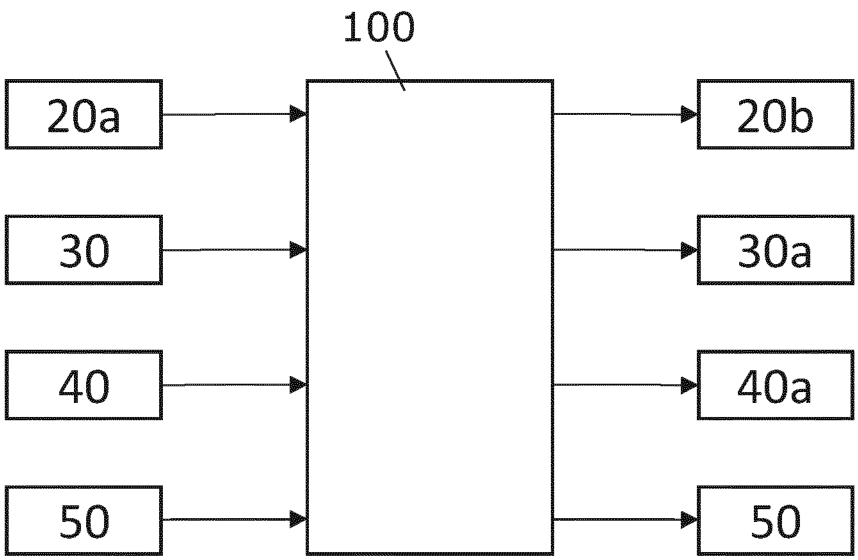
FIG. 7 shows further inputs and outputs of the optimisation algorithm.

FIGS. 6 and 7 give an example of the operation of an optimisation algorithm 100 which may be run by the landing systems of each of the aircraft 1-4 to determine a set of optimised landing plans. Each aircraft has a landing system which has received the landing plans of all other aircraft of the virtual fleet via the direct aircraft-to-aircraft communications described above. A first set of landing plans 10, 20, 30, 40 is input into the optimisation algorithm 100 as shown in FIG. 6. The optimisation algorithm 100 determines an optimised set of landing plans 10*a*, 20*a*, 30, 40 based on this first set of landing plans. In the optimised set of landing plans, the landing plans 10, 20 of the first and second aircraft 1, 2 have been revised as described above to accommodate the landing plans 30, 40 of the third and fourth aircraft respectively. The landing plans 30, 40 of the third and fourth aircraft 3, 4 do not change in this example.

The optimised set of landing plans 10*a*, 20*a*, 30, 40 is optimised for the entire virtual fleet 1-4, rather than for any one member of the virtual fleet.

After the first aircraft 1 lands, the second aircraft 2 becomes the lead aircraft and the process repeats as shown in FIG. 7. A third set of landing plans 20*a*, 30, 40, 50 is input into the optimisation algorithm 100 (the landing plan 50 being the landing plan of a fifth aircraft which has joined the virtual fleet). The optimisation algorithm 100 determines an optimised set of landing plans 20*b*, 30*a*, 40*a*, 50 based on the third set of landing plans. In the optimised set of landing plans 20*b*, 30*a*, 40*a*, 50, the landing plans 20*a*, 30, 40 of the aircraft 2-4 have been modified to accommodate the landing plan 50 of the fifth aircraft.

The optimisation algorithm seeks to optimise parameters for all of the aircraft in the virtual fleet. Parameters can be at least one of: total airport delay; total aircraft fuel; total aircraft brake and tyre wear; and total aircraft delay. The optimisation algorithm may assign weights to each parameter to represent the relative importance of each parameter.

Determining an optimal set of landing plans for a virtual fleet with a low number of aircraft may be a fairly simple calculation if the number of aircraft in the virtual fleet is low (in this case, four aircraft). However, if the virtual fleet has many aircraft, then running the optimisation algorithm 100 on an aircraft may become computationally challenging. This is partly due to the number of parameters which may need to be considered by the algorithm (i.e. runway speed profiles, braking command profiles, landing plans, intended runway exit, intended runway stopping distance, etc.) and the inter-relationships between different parameters and for each aircraft, as well as information about the airport (e.g. number of runways, shared taxiing routes, location/distance of runway exit on each runway, etc.).

A particularly computationally efficient form for the optimisation algorithm 100 is an evolutionary algorithm, such as a genetic algorithm or a swarm algorithm. For example, an evolutionary algorithm may generate an initial population of sets of landing plans for the virtual fleet; breed new sets of landing plans with an element of mutation; evaluate the individual fitness of the new sets; and replace the least-fit sets of landing plans with new sets of landing plans.

The evolutionary algorithm may run continuously, repeatedly modifying the population of sets of landing plans. At a threshold, either of distance to runway or estimated time to landing, the lead aircraft identifies the most-fit set of landing plans in the population (this most-fit set including the final landing plan of the lead aircraft); transmits its final landing plan to air-traffic control; and then lands at the airport based on its final landing plan. This process can avoid negotiations with air-traffic control and increase airport thoroughput and efficiency and reduce aircraft maintenance.

In the examples above, a set of landing plans of all aircraft of the virtual fleet is input into the optimisation algorithm, which then generates a set of optimised landing plans. In an alternative example, other types of information may be input into the optimisation algorithm 100 instead of a set of landing plans. For example, the inputs into the optimisation algorithm 100 may be static aircraft parameters for all aircraft of the virtual fleet (for instance the weights or types of the aircraft); status information for all aircraft of the virtual fleet (for instance brake wear, tyre wear or fuel amount); schedule information for all aircraft of the virtual fleet (for example acceptable delay or scheduled arrival time); and/or any other type of information which may be required to calculate an optimal set of landing plans.

So in this case, such other types of information may be transmitted via the direct aircraft-to-aircraft communications 1*b*, 2*b*, 3*b*, 2*c*, 3*c*, 4*c* instead of the landing plans 10, 20, 30, 40 shown in FIG. 1.

Alternatively, the direct aircraft-to-aircraft communications 1*b*, 2*b*, 3*b*, 2*c*, 3*c*, 4*c* may include such other types of information in addition to the landing plans 10, 20, 30, 40. So such other types of information may be input into the optimisation algorithm along with the landing plans.

In the example of FIGS. 6 and 7, the optimisation algorithm 100 may run simultaneously on each aircraft 1-4 in the virtual fleet, since each aircraft has the full set of landing plans for the virtual fleet. An alternative arrangement is shown in FIG. 8.

Figure 8:
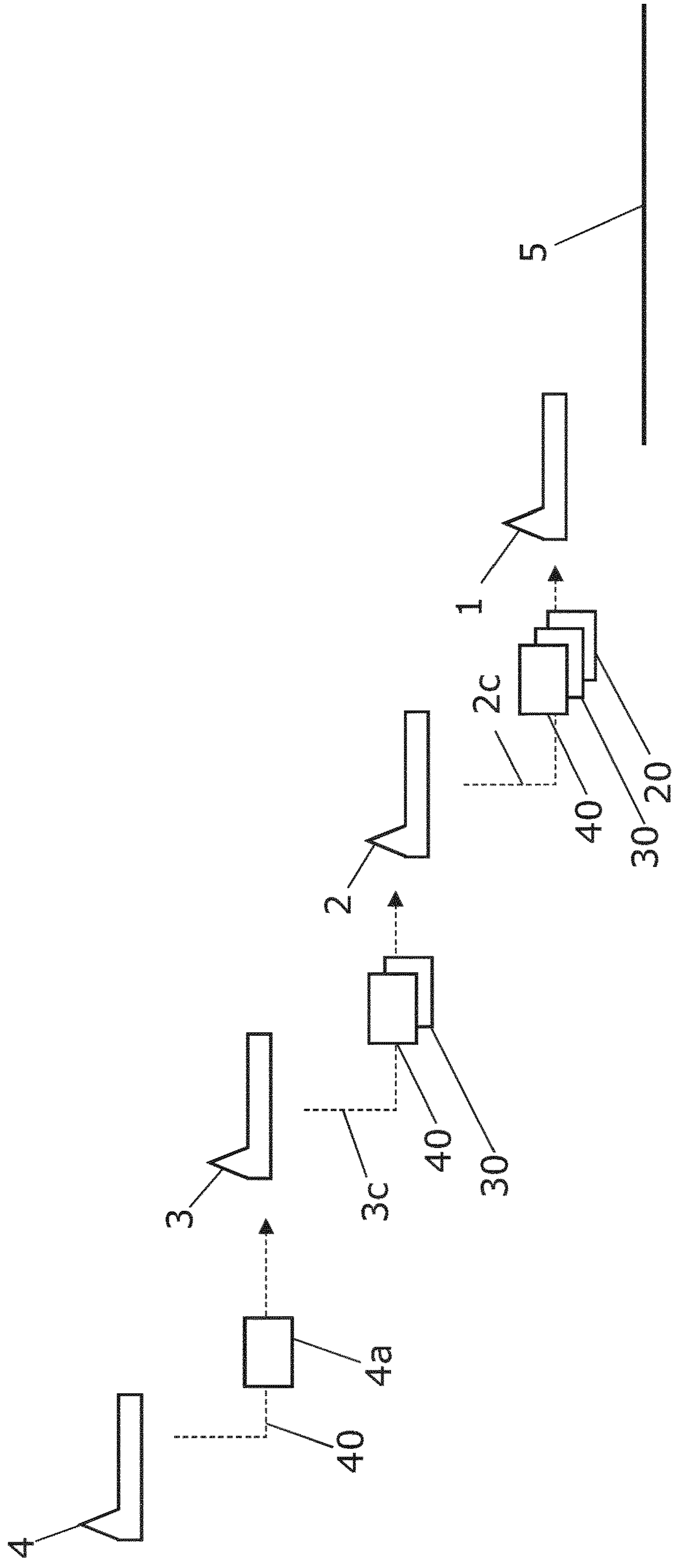
FIG. 8 shows the virtual aircraft fleet of FIG. 1 communicating via a one-way daisy-chain network.

Certain elements of FIG. 8 are identical to FIG. 1, and these elements will not be described again. FIG. 8 is identical to FIG. 1, except the daisy-chain leads only in a single direction—towards the lead aircraft. Thus only the lead aircraft (in this case the first aircraft 1) runs the optimisation algorithm 100 of FIGS. 6 and 7. When the first aircraft 1 lands and the second aircraft 2 becomes the lead aircraft, the second aircraft 2 runs the optimisation algorithm 100 as shown in FIG. 7 to determines its landing plan.

Figure 9:
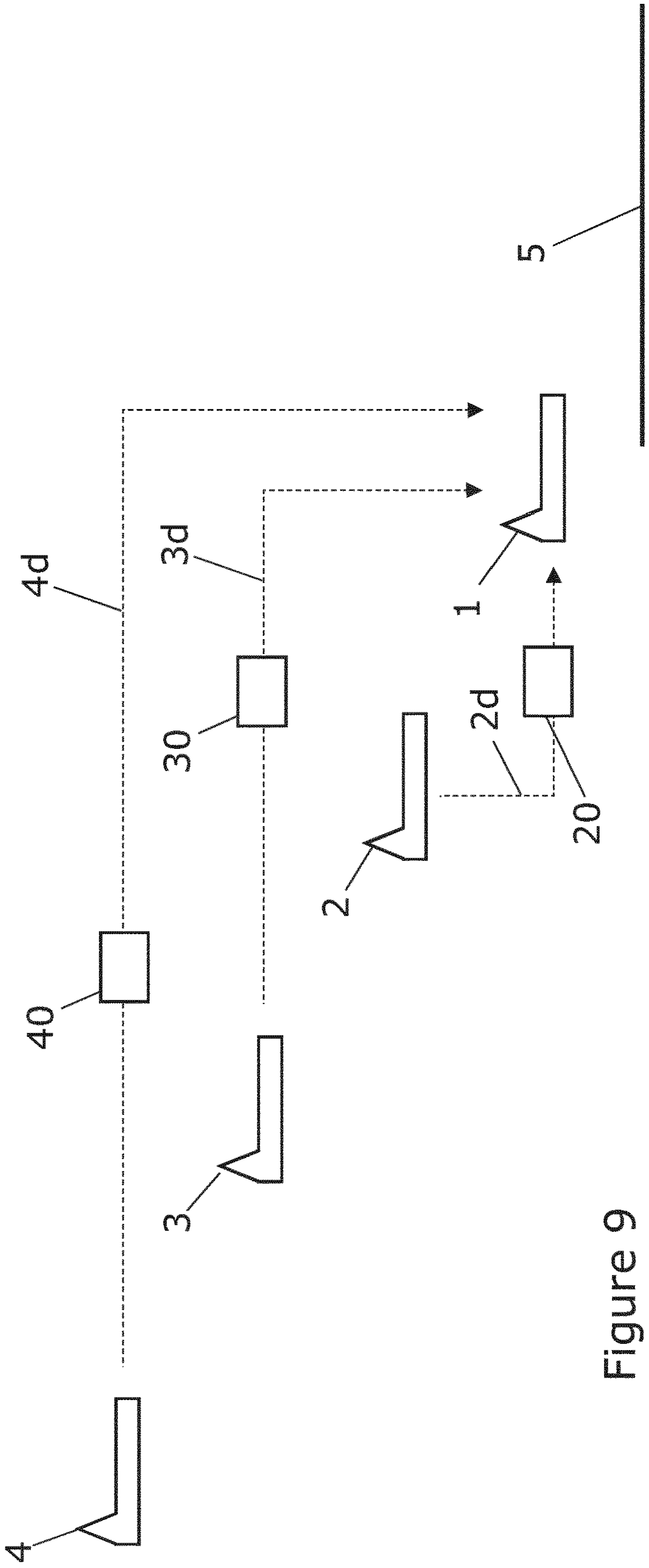
FIG. 9 shows the virtual aircraft fleet of FIG. 1 communicating via a hub-and-spoke network.

FIG. 9 shows an alternative "hub and spoke" communication arrangement. Certain elements of FIG. 9 are identical to FIG. 1, and these elements will not be described again. The following aircraft 2-4 communicate their landing plans to the lead aircraft (in this case the first aircraft 1) via respective direct aircraft-to-aircraft communications 2*d*, 3*d*, 4*d*. In this "hub and spoke" arrangement only the lead aircraft collects the landing information of the virtual fleet. When the first aircraft 1 lands and the second aircraft 2 becomes the lead aircraft, the second aircraft 2 receives the landing plans of the virtual fleet and runs the optimisation algorithm 100 to determine its landing plan.

Figure 10:
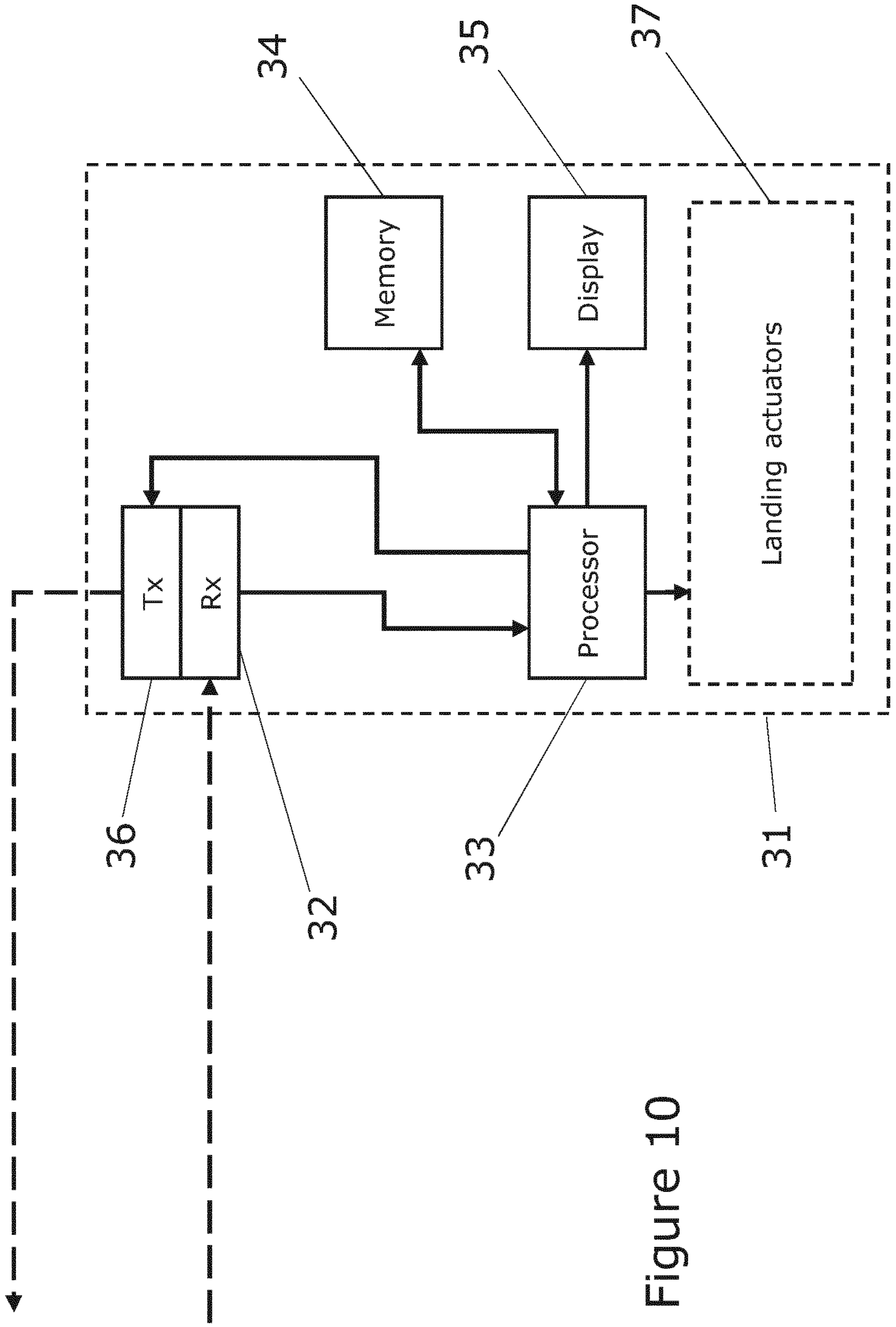
FIG. 10 shows a landing system.

Each aircraft 1-4 comprises a landing system 31 as shown in FIG. 10 which is operated to land the aircraft by one of the methods described above. The landing system 31 comprises a receiver 32 arranged to receive landing plans and/or other information from another aircraft of the virtual fleet via one of the direct aircraft-to-aircraft communications mentioned above; and a processor 33 arranged to run the optimisation algorithm 100 to determine an optimised set of landing plans for the virtual fleet. The population of sets of landing plans is stored in a memory 34.

The landing plan of the aircraft may be displayed to the pilot by a display 35 and/or transmitted to a following aircraft via a transmitter 36.

One or more actuators 37 (such as brakes, thrust reversers, spoilers etc.) are arranged to land the aircraft based on its landing plan. Thus when it is time to land the aircraft, the processor 33 sends control commands to the various actuators 37 to land the aircraft based on its final landing plan. The processor 33 may be part of the aircraft's auto-flight computer, and may run "brake-to-vacate" software which controls the landing of the aircraft based on its final landing plan.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A method of landing a first aircraft, wherein the first aircraft comprises a landing system, and the first aircraft is in a virtual fleet of aircraft, the method comprising operating the landing system to:

receive information from a second aircraft in the virtual fleet via a direct aircraft-to-aircraft communication from the second aircraft to the first aircraft;

generate or optimize a set of landing plans for the virtual fleet using the information, wherein the set of landing plans includes landing plans for aircraft in the virtual fleet, wherein the aircraft in the virtual fleet are aircraft flying toward the same airport;

select the landing plan for the first aircraft from the landing plans;

land the first aircraft based on the landing plan for the first aircraft, wherein the first aircraft is ahead of the other aircraft in the virtual fleet in approaches to the airport, and the first aircraft sends at least one of the landing plans to the second aircraft, wherein the second aircraft is behind the first aircraft in approaching the airport and is ahead of all of the aircraft in the virtual fleet except for the first aircraft.

2. The method of landing an aircraft according to claim 1, wherein the landing plan for the first aircraft comprises at least one of: an approach air speed, a runway speed profile, a braking command profile, a thrust reverser command profile, a spoiler deployment profile, an exit from the runway, or a taxiing route.

3. The method of landing an aircraft according to claim 1, wherein the generation of the landing plans includes revision of an initial landing plan for the first aircraft.

4. The method of landing an aircraft according to claim 1, wherein the set of landing plans is optimized for the entire virtual fleet.

5. The method of landing an aircraft according to claim 4, wherein the optimization of the set of landing plans is performed with an evolutionary algorithm.

6. The method of landing an aircraft according to claim 1, wherein the information received from the second aircraft is information associated with the second aircraft.

7. The method of landing an aircraft according to claim 6, wherein the information received from the second aircraft comprises at least one of: a static aircraft parameter of the second aircraft; status information of the second aircraft; schedule information of the second aircraft; or a landing plan of the second aircraft.

8. The method of landing an aircraft according to claim 6, further comprising operating the landing system to receive further information associated with a third aircraft of the virtual fleet;

wherein the generation of the set of landing plans is based on the information received from the second aircraft and the further information associated with the third aircraft.

9. The method of landing an aircraft according to claim 8, wherein the further information associated with the third aircraft is received via a direct aircraft-to-aircraft communication to the first aircraft from the second aircraft or the third aircraft.

10. The method of landing an aircraft according to claim 1, wherein the landing plan of the first aircraft is transmitted to the second aircraft via a direct aircraft-to-aircraft communication from the first aircraft to the second aircraft.

11. The method of claim 1, wherein the landing plan for the first aircraft includes a plan to decelerate the first aircraft during landing or a runway exit from a runway on which the first aircraft lands.

12. A first aircraft in a virtual fleet of aircraft, wherein the first aircraft includes:

a receiver arranged to receive information from at least one other aircraft in the virtual fleet via a direct aircraft-to-aircraft communication between the at least one other aircraft and the first aircraft;

one or more actuators in the first aircraft configured to land the first aircraft based on a landing plan of the first aircraft, and a processor configured to:

use the information, to generate or optimize a set of landing plans for the aircraft in the virtual fleet, wherein the aircraft in the virtual fleet are aircraft flying toward the same airport, and select from the set of landing plans, the landing plan for the first aircraft;

wherein the first aircraft is ahead of the other aircraft in the virtual fleet in approaches to the airport, and wherein the first aircraft is configured to send at least one of the landing plans to the at least one other aircraft, wherein the at least one other aircraft is behind the first aircraft in approaching the airport and is ahead of all of the aircraft in the virtual fleet except for the first aircraft.

13. A pair of aircraft comprising:

the first aircraft according to claim 12; and a second aircraft of the virtual fleet arranged to transmit the information to the first aircraft via the direct aircraft-to-aircraft communication from the second aircraft to the first aircraft.

14. A method of landing a first aircraft in a virtual fleet of aircraft, the first aircraft comprises a landing system and the method comprises operating the landing system to:

receive a landing plan from at least one other aircraft of the virtual fleet;

input the landing plan from the at least one other aircraft of the virtual fleet into an optimization algorithm which determines a set of landing plans for the virtual fleet of aircraft which is optimized for the entire virtual fleet, wherein the aircraft in the virtual fleet are aircraft flying toward the same airport, the set of landing plans for the virtual fleet of aircraft including a landing plan of the first aircraft; and land the first aircraft based on the landing plan of the first aircraft, wherein the first aircraft is ahead of the other aircraft in the virtual fleet in approaches to the airport, and the first aircraft sends at least one of the landing plans to the at least one other aircraft, wherein the at least one other aircraft is behind the first aircraft in approaching the airport and is ahead of all of the aircraft in the virtual fleet except for the first aircraft.

* * * * *